United States Patent [19]

McKinley

[11] Patent Number: 5,296,972
[45] Date of Patent: Mar. 22, 1994

[54] NON-POLARIZING IMAGE ROTATION APPARATUS AND METHOD

[75] Inventor: William G. McKinley, Littleton, Mass.

[73] Assignee: Litton Systems, Inc., Lexington, Mass.

[21] Appl. No.: 923,314

[22] Filed: Jul. 31, 1992

[51] Int. Cl.$^5$ .................... G02B 17/00; G02B 5/08; G02B 27/64
[52] U.S. Cl. ..................................... 359/861; 359/401
[58] Field of Search ................ 359/861, 857, 834, 401

[56] References Cited

U.S. PATENT DOCUMENTS

| | | | |
|---|---|---|---|
| 1,964,075 | 6/1934 | Ott | 359/401 |
| 2,406,798 | 9/1946 | Burroughs . | |
| 3,614,448 | 10/1971 | DiProse et al. | 359/834 |
| 4,252,410 | 2/1981 | Jain | 359/861 |
| 4,822,150 | 4/1984 | Duarte | 359/834 |

OTHER PUBLICATIONS

"Use of a three-mirror image rotator in a laser-produced plasma experiment", *Applied Optics*, vol. 18, No. 23, Dec. 1, 1979, pp. 3883-3884.

A. R. Chraplyvy, "Polarization . . . ", *Applied Optics*, vol. 15, Sep. 1976, pp. 2022-2023.

*Primary Examiner*—Jon W. Henry
*Attorney, Agent, or Firm*—Michael H. Wallach

[57] ABSTRACT

An optical system and method for rotating an image of an object is disclosed. The device consists of a plurality of optical surfaces for either reflecting or refracting the light along an optical path through the device. The optical surfaces divide the optical path into optical path segments which intersect at predetermined angles. These angles are selected to minimize polarization of the output light. The optical path segments lie in more than one plane.

23 Claims, 4 Drawing Sheets

NON-POLARIZING IMAGE ROTATION APPARATUS AND METHOD

BACKGROUND OF THE INVENTION

Typically, optical imaging systems admit light from an object to create an image of the object. Often, it becomes necessary to rotate the image to facilitate viewing or analysis. Image rotation is used in aerial reconnaissance in which the imaging system is mounted in a moving aircraft for viewing ground objects. As the aircraft moves by the object the imaging system rotates to maintain the object in the field of view. If the object is not directly below the aircraft, the rotation of the imaging system causes the image to rotate with respect to the detection device receiving the image. In many cases, this image rotation is undesirable and must be corrected.

One possible means of correcting the image rotation is to rotate the detector. However, this is seldom feasible. Rotation of the object is also generally not feasible. Therefore, devices have been developed which are integrated into the imaging system for rotating the image in coordination with the rotation of the imaging system. The devices are located along the optical axis of the imaging system between the entrance aperture of the imaging system and the detector.

One such device is a K-mirror system. The K-mirror system consists of three mirrors oriented to reflect incoming light along a desired path. Light from the object enters the K-mirror system and impinges on each mirror in succession. Thus, for each point on the object, a path of light successively strikes a single point on each of the three mirrors and ends at a point in the image. A characteristic of the K-mirror system is that all five of these points, namely, the point on the object, the point on the image, and the points on each of the three mirrors, lie in a single plane.

In a stationary position, the output image of the K-mirror system is in an inverted orientation with respect to the object. As the K-mirror system is rotated, the output image rotates at twice the rotation rate of the K-mirror system. That is, for 90 degrees of K-mirror system rotation, the image rotates 180 degrees.

The K-mirror system has some fundamental limitations to its usefulness. The mirrors in the K-mirror system are oriented such that the light is reflected at obtuse angles. As a result, the output light from the K-mirror system possesses a high degree of polarization. In many applications, this polarization is undesirable. Also, as the K-mirror system rotates, it sweeps out a relatively large spatial volume, therefore consuming a large amount of space.

SUMMARY OF THE INVENTION

The present invention comprises, in general, an optical system and method for rotating the image of an object. The system includes an entrance aperture for admitting light into the system and an exit aperture for allowing light to exit the system. The light follows an optical path through the system. This optical path begins at the entrance aperture and ends at the exit aperture. The system also includes a plurality of optical surfaces which alter the optical path. The optical path is divided into a plurality of optical path segments, each of which is along an optical path segment axis. Two of these axes form a plane and at least one other axis lies outside that plane. The optical surfaces within the system are oriented such that contiguous segment axes form preselected angles to each other.

The angles between contiguous segment axes are selected to minimize the polarization of the light out of the system. In one embodiment, only one of the angles is obtuse. In another embodiment, none of the angles are obtuse.

The optical surfaces in the image rotating system or device may be selected to either reflect or refract the light, but an odd number of reflecting surfaces must be used. Also, a combination of reflecting and refracting surfaces may be used. In one embodiment of the invention, the reflecting surfaces comprise an odd number of mirrors greater than five to provide the rotation function. In an alternate embodiment, five mirrors are used.

The system has an optical axis defined as the axis along which light enters and exits the system. In one embodiment, no more than three optical path segment axes lie in a plane with this axis. In this embodiment, two of the segment axes are the entrance segment axis between the entrance aperture and the first mirror and the exit segment axis between the last mirror and the exit aperture. In this embodiment, only one other segment axis shares a plane with these two axes. In another embodiment, the exit segment axis does not lie along the optical axis of the device. When the device is rotated about the optical axis, the exit segment precesses. In this embodiment, scanning of the image across a detector is facilitated.

The present invention provides certain advantages over other image rotating devices. The angles at which the light is reflected are selected such that polarization effects are compensated through the use of three dimensional folds and device volume in operation is minimized. This greatly reduces the undesirable polarization of the exiting light found in other systems. Also, the geometry of the device allows it to occupy less space than prior devices, specifically the K-mirror system. This is a great benefit as optical systems continue to be restricted to smaller and smaller volumes.

BRIEF DESCRIPTION OF THE DRAWINGS

The forgoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
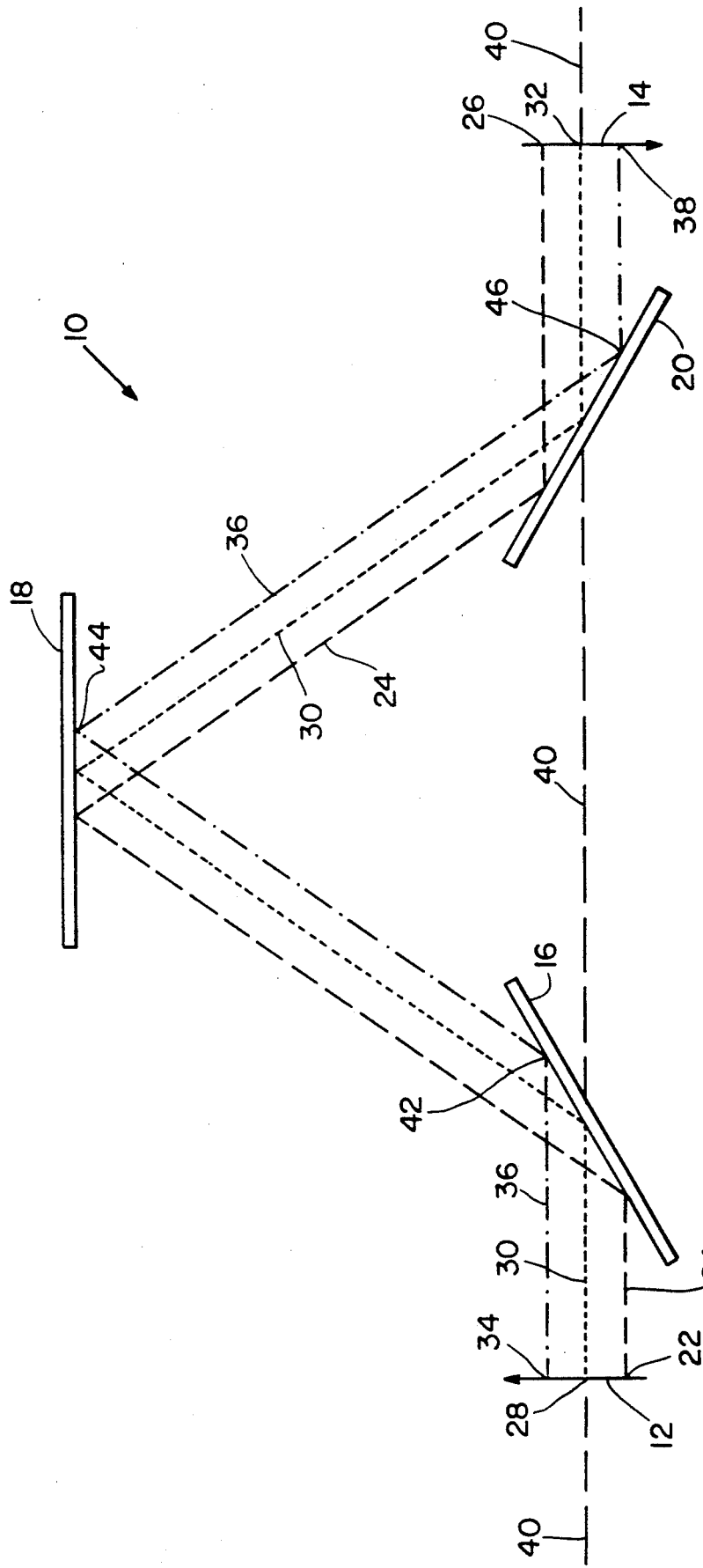
FIG. 1 is a schematic view of a prior art image rotating device.

FIG. 1 schematically depicts the prior art K-mirror system 10. Light from object 12 follows a path through the system to form inverted image 14. The light is reflected by each mirror 16, 18, 20 in succession as it travels through the system.

Light from each point on the object 12 follows its own distinct path through the device and out to the image 14. For example, light from point 22 on object 12 follows path 24 to point 26 on image 14; light from point 28 follows path 30 to point 32; and light from point 34 follows path 36 to point 38.

It should be noted that the image 14 is at a 180 degree inverted orientation to the object 12. This can be seen by comparing the positions of corresponding points in the object 12 and the image 14. For example, point 34 is near the top of the object 12. But, in the image 14, the corresponding point 38 is near the bottom.

Light enters and exits the system 10 along optical axis 40. The device 10 operates by rotation about this optical axis 40. As the system 10 rotates, the image 14 also rotates. The image 14 rotates at twice the rate of the system 10. That is, for each degree of rotation of the system 10, the image 14 rotates two degrees.

A characteristic of the system 10 is that the object, the image, and the optical path share a common plane. The light travelling between a point on the object and the corresponding point on the image follows a specific optical path through the system 10. In the system 10, the point on the object, the corresponding point on the image, and the three corresponding points on the mirrors all lie in a single plane. To illustrate, referring again to FIG. 1, the light from point 34 on the object 12 follows path 36 through the device 10. The path 36 strikes mirror 16 at point 42, mirror 18 at point 44, and mirror 20 at point 46. The path 36 ends at point 38 on the image 14. All five points 34, 42, 44, 46, and 38 lie in a single plane.

The geometry of the K-mirror system 10 limits its usefulness in certain applications. The light through the device 10 must be reflected at obtuse angles at least at mirrors 16 and 20. This tends to polarize the reflected light. In many applications, especially radiometric or photometric, this polarization is undesirable. Also, when the device 10 is rotated about the optical axis 40, it sweeps out a large volume. Thus, it may not be useful in applications in which space is restricted.

Referring now to FIGS. 2, 3a-c, and 4, an embodiment of the image rotating device 10 of the present invention will be described in detail. The embodiment comprises a plurality of mirrors, in this case, five, oriented to provide rotation of an image of an object. Note: In the interest of clarity, FIG. 2 does not show the actual mirrors 110, 120, 130, 140, and 150, but rather, it shows their positions within a three dimensional coordinate system with mutually perpendicular axes X, Y, and Z.

The Z axis is the optical axis 102 of the device 100. Light from an object 12 enters the device 100 through entrance aperture 104. The light follows an optical path 106 shown generally in dark lines from mirror to mirror in the order 110, 120, 130, 140, 150 along respective line segments 122-127 which form optical path 106. After reflecting from mirror 150, the light exits the device 100 through exit aperture 105 to image 14. Note that, like the K-mirror system, the image is in an inverted orientation relative to the object 12.

The optical path 106 is divided into optical path segments by the mirrors. Each of the segments can be thought of as following an optical path segment axis. The segments are numbered 122-127 in FIG. 2. Segment 122 is the first segment in the optical path 106. It is located between the entrance aperture 104 and the first mirror at location 110. Segment 127 is the last segment of the optical path 106. It is located between the last mirror 150 and the exit aperture 105. The segment axes followed by segments 122 and 127 lie along the optical axis 102 of the device 100.

Figure 2:
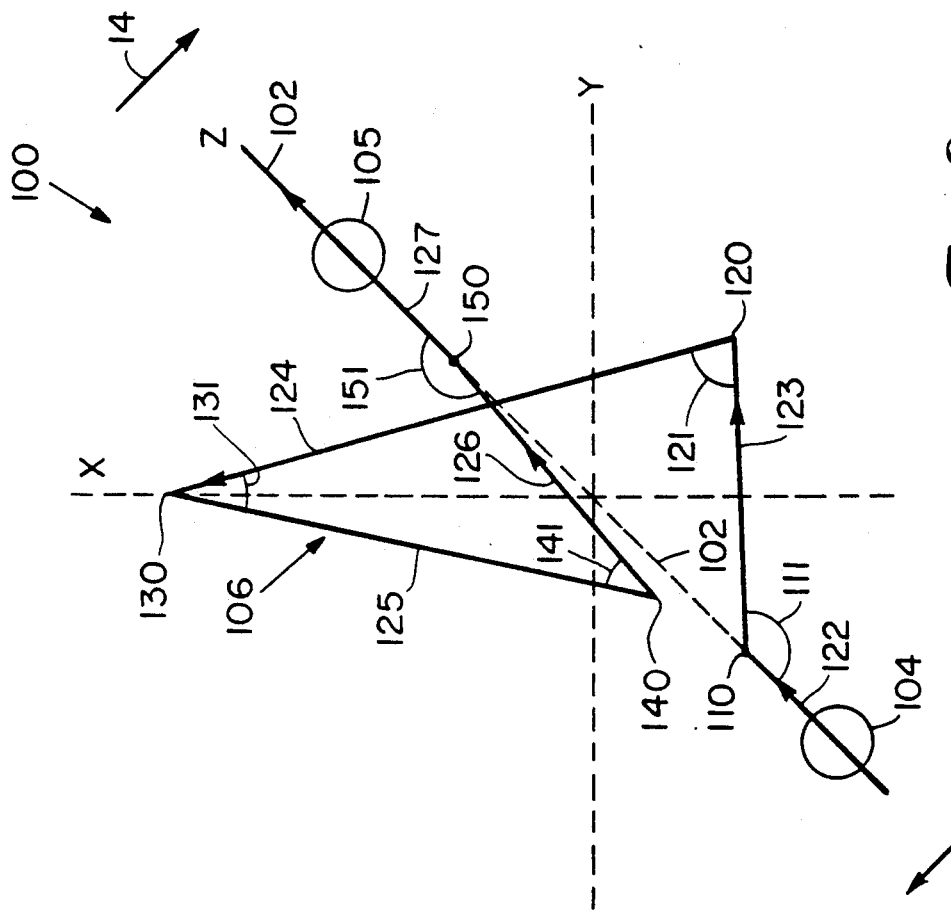
FIG. 2 is a schematic isometric view of an embodiment of the image rotating device of the present invention.
Figure 3A:
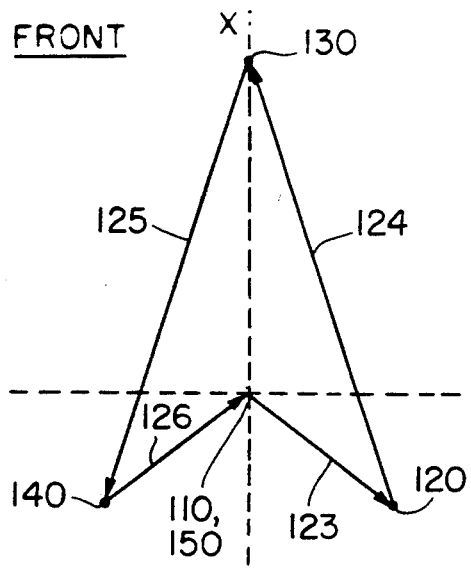
FIG. 3a is a schematic front view of the embodiment of FIG. 2.
Figure 3B:
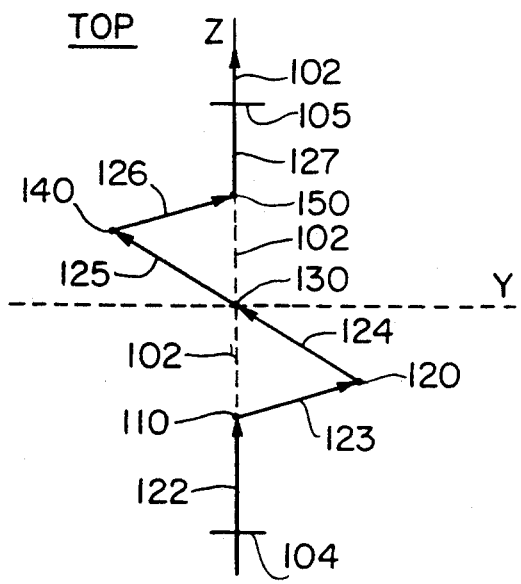
FIG. 3b is a schematic top view of the embodiment of FIG. 2.
Figure 3C:
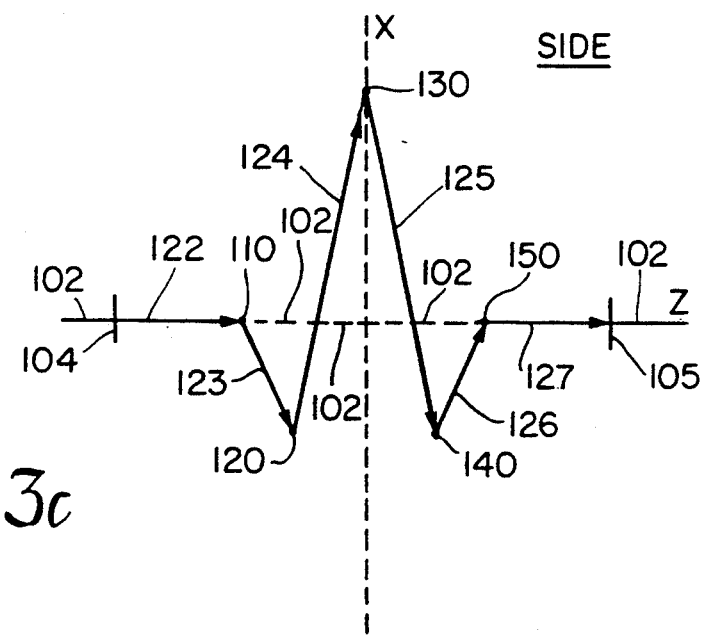
FIG. 3c is a schematic side view of the embodiment of FIG. 2.

The five mirrors of the embodiment of FIG. 2 are oriented with respect to each other such that contiguous optical path segments along the optical path 106 form predetermined angles with each other. These angles are chosen such that the change in polarization of the light exiting through the exit aperture 105 is minimized and the volume required is a minimum.

Angles 111, 121, 141, 151 are selected as two pairs of acute angles—angles 111, 121 forming one pair and angles 141, 151 forming a second pair. The angles in each pair are selected such that each pair of corresponding mirrors introduces a minimum net polarization of the light. Thus, polarization is introduced only by mirror 130 which reflects the light at angle 131. In the preferred embodiment, angle 131 is an acute angle and as such introduces minimal polarization. Properly optimized, the residuals from the other pairs; 111 and 121, and 141 and 151; compensate for the residual polarization of mirror 130.

The image rotating device 100 of the present invention operates by rotation about its optical axis 102. As it is rotated, the output image also rotates about the optical axis. The image rotates at twice the rotation rate of the device so that each degree of device rotation produces two degrees of image rotation. In an alternative embodiment, the exit segment 127 does not lie along the optical axis 102 of the device 100. As the device 100 rotates about the axis 102, segment 127 precesses about the axis 102. The resulting motion of the image allows it to be scanned across a detector. Thus an image with reduced polarization effects can be scanned.

It can be seen from FIGS. 2, 3a-3c and 4 that the geometry of the device 100 of the present invention differs from that of the prior art K-mirror 10, of FIG. 1 by having an optical path 106 which does not lie in a single plane. In one embodiment only three of the segments occupy the same plane, including segments 122 and 127 which lie along the optical axis 102 of the device 100. Any two contiguous segments also define a plane. Unlike the prior art K-mirror system, the device 100 includes other segments which lie outside that plane. Also, the device 100 sweeps out less volume than the K-mirror system when rotated about its optical axis. Therefore, the device 100 is useful in systems having size restrictions.

Figure 4:
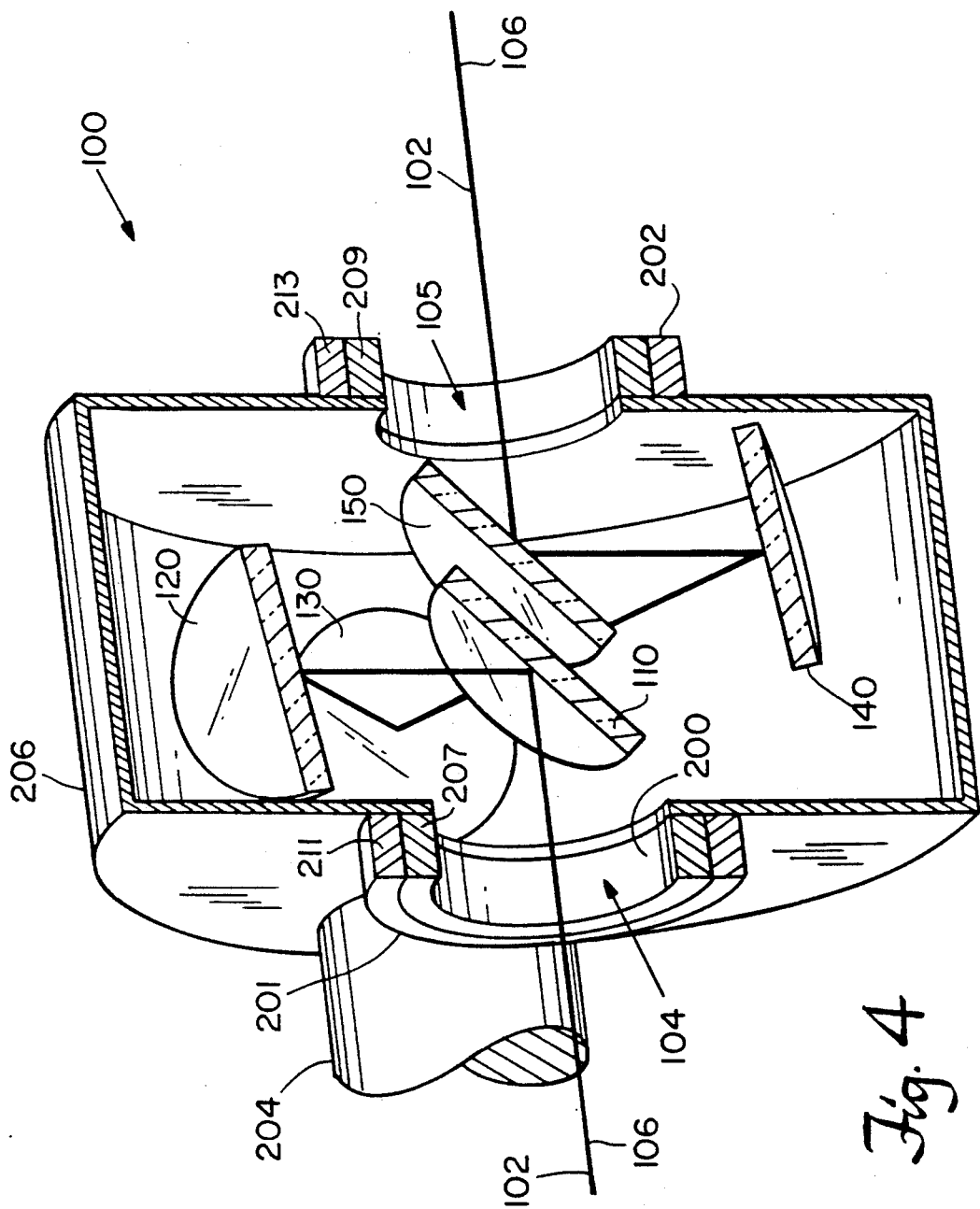
FIG. 4 is a cut-away view of the embodiment of FIG. 2.

FIG. 4 depicts a physical embodiment of the image rotating device 100 of the present invention. The mirrors 110, 120, 130, 140, 150 are fixedly attached by well-known means to the inside of shell or base 206 in their appropriate positions. Light enters the device 100 along optical path 106 through entrance aperture 104. The light is reflected along the path 106 by mirrors 110, 120, 130, 140, and 150 in succession. The light leaves the device 100 through exit aperture 105. Note that the device 100 is shown at a rotational orientation different from that of FIG. 2.

The device 100 is mounted in an optical system via bearings 200 and 202. A mounting apparatus (not shown) of the optical system is rigidly attached to stationary portions 207, 209 of the bearings 200, 202. Typically, the mounting apparatus consists of hollow tubing pressed into the bearing apertures. The stationary portions 207, 209 of the bearings are not fixedly mounted to the shell 206 and move freely against moveable portions 211, 213 respectively. The moveable portions 211, 213 are fixedly attached to the shell 206. Thus, the shell 206 is rotatable with respect to the optical system in which the device is mounted. To rotate the device 100, motor shaft 204 engages the outside surface 201 of the moveable portion 211 of bearing 200. Because this portion is rigidly attached to the shell 206, rotation of the motor shaft 204 causes the shell 206 and thus the device 100 to rotate about the optical axis 102. In the preferred embodiment, the motor shaft 204 engages the outer surface 201 of bearing 200 via the meshing of gear teeth (not shown) on the surface of the shaft 204 and the outer surface 201 of the bearing 200. In an alternate embodiment, both the shaft 204 and the outer surface 201 are covered with rubber, and the friction between the two drives the bearing 200 to rotate the device 100 about the optical axis 102.

The motor shaft 204 is driven by a motor (not shown). The motor is controlled by a motor controller (not shown). The motor and controller can place the device 100 in any desired orientation. Thus, the image of the object can be rotated as desired.

The device 100 may be used in many different optical systems requiring image rotation. These include aerial reconnaissance applications and other types of optical devices including, without limitation, cameras, lasers, radiometers, spectrometers, photometers, monochrometers, and the like.

While this invention has been particularly shown and described with references to preferred embodiments thereof, it will be understood by those skilled in the art that various changes in form and details may be made therein without departing from the spirit and scope of the invention as defined by the appended claims. For example, refracting surfaces may be used to alter the optical path within the device instead of or in addition to reflecting surfaces.

I claim:

1. An optical system for rotating an image of an object comprising:
   an entrance aperture for admitting light into the system along an optical axis of the system, said light entering along an optical path and following the optical path through the system;
   an exit aperture for allowing the light to exit the system along the optical axis of the system and the optical path, the system being rotatable about the optical axis of the system; and
   a plurality of optical surfaces for dividing the optical path into a plurality of optical path segments, each of said segments being along an optical path segment axis, two of said optical path segment axes defining a plane and at least a third optical path segment axis being outside the plane.

2. The optical system of claim 1 wherein the optical surfaces are an odd number of mirrors.

3. The optical system of claim 1 wherein the optical surfaces are five mirrors.

4. The optical system of claim 1 wherein the optical surfaces divide the optical path by reflecting the light.

5. The optical system of claim 1 wherein the optical surfaces divide the optical path by reflecting and refracting the light.

6. The optical system of claim 5 wherein no more than three optical path segment axes lie in a plane with the optical axis.

7. The optical system of claim 1 wherein the optical surfaces are oriented such that contiguous optical path segment axes along the optical path are at preselected angles to each other.

8. The optical system of claim 7 wherein the angles are selected to minimize polarization of light exiting through the exit aperture.

9. The optical system of claim 7 wherein at least one of the angles is obtuse.

10. The optical system of claim 1 further comprising means for rotating the optical system about the optical axis of the system.

11. The optical system of claim 10 wherein an optical path segment axis through the exit aperture is non-colinear with the optical axis such that when the system is rotated by the rotating means, said segment axis precesses about said optical axis.

12. An optical image rotating device comprising:
    an entrance aperture for admitting light from an object into the device along an optical path, said light following the optical path through the device;
    an exit aperture for allowing the light to exit the device along the optical path;
    at least five mirrors supported in a base for dividing the optical path into a plurality of optical path segments, each of said segments being along an optical path segment axis, two of said optical path segment axes defining a plane and at least a third optical path segment axis being outside the plane, and
    means for rotating the base about an optical axis of the system to rotate the image.

13. A method of rotating an image of an object with an optical system comprising:
    allowing light from the object to enter the system through an entrance aperture along an optical path, said light following the optical path through the system;
    allowing the light to exit the system through an exit aperture along the optical path;
    altering the optical path by dividing the optical path into a plurality of optical path segments, each of said segments being along an optical path segment axis, two of said optical path segment axes defining a plane and at least a third optical path segment axis being outside the plane; and
    rotating the optical system to rotate the image.

14. The method of claim 13 further comprising minimizing polarization of the light exiting the system.

15. The method of claim 13 wherein the altering step comprises reflecting the light.

16. The method of claim 13 wherein the altering step comprises refracting the light.

17. The method of claim 13 wherein the optical path is altered an odd number of times.

18. The method of claim 13 wherein the optical path is altered five times.

19. The method of claim 13 wherein the light enters and exits the optical system along an optical axis.

20. The method of claim 19 wherein the optical path is altered such that no more than two optical path segment axes lie in a plane with the optical axis.

21. The method of claim 13 wherein the optical path is altered such that contiguous optical path segment axes along the optical path are at preselected angles to each other.

22. The method of claim 21 further comprising selecting the angles to minimize polarization of the light exiting the system.

23. The method of claim 21 wherein at least one of the angles is obtuse.

* * * * *